United States Patent Office 2,803,144
Patented Aug. 20, 1957

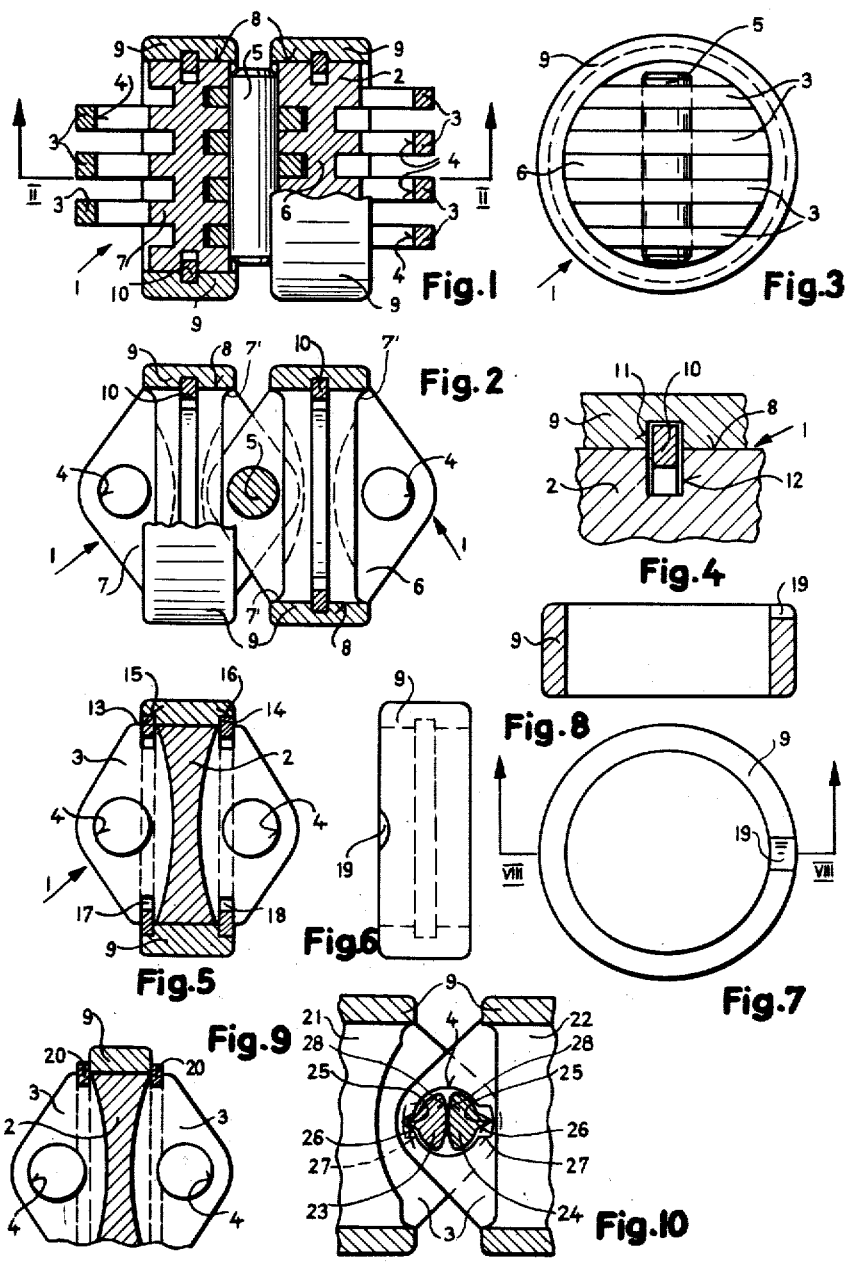

2,803,144

TRANSMISSION CHAIN FOR V-TYPE PULLEYS

Werner Gesche and Otto Dittrich, Bad Homburg vor der Hohe, Germany, assignors, by mesne assignments, to Reimers-Getriebe K. G., Rennweg, Zurich, Switzerland Application February 10, 1956, Serial No. 564,805

Claims priority, application Netherlands February 20, 1956

12 Claims. (Cl. 74—236)

The present invention relates to a transmission chain for conical or V-type pulleys.

It is an object of the present invention to provide a metallic single-strand link chain which is especially adapted as a transmission chain for an infinitely variable friction drive employing V-type pulleys, and wherein such chain is provided with a series of annular pressure bodies or pressure rings which are mounted on the individual links of the chain and are capable of rotating thereon about the longitudinal axis of the chain.

The link chains of this general type which have been known prior to this invention are generally made up of links which consist of a plurality of individual link plates which are held together by link pins. Consequently, the bearing surface for each pressure ring which is mounted on these link plates is formed by the outer surfaces thereof and is thus not continuous but interrupted, as the result of which a homogeneous oil film can hardly ever form or be maintained on the bearing surface at the inside of the pressure ring. Also, the transverse rigidity of such links consisting of individual plates is not sufficient to take up the transverse forces which are exerted upon the links. Consequently, these transverse forces have to be taken up entirely by the pressure rings which therefore have to be made of considerable wall thickness which, in turn, means that the weight of the chain becomes too heavy in relation to the tensile force which may be transmitted by the link plates, and the diameter of the links and the minimum radius of the chain becomes too large. Furthermore, due to the relatively heavy weight of the thick rollers of such a chain, the centrifugal forces become so large as to dissipate a part of the admissable tensile force of the chain, thus reducing the tensile load which may be transmitted thereby.

It is another object of the present invention to provide a link chain of the type as described which will overcome these disadvantages of the chains previously known.

A further object of the invention is to provide a link chain of the type as described in which each of the link bodies on which the pressure rings are mounted consists of a single piece of material and has a continuous cylindrical outer bearing surface for supporting a pressure ring, and wherein such bearing surface has a width corresponding to the full width of the pressure ring.

Some of the advantages obtained by such a link structure reside in the fact that the bearing surface of the link for supporting the pressure ring or roller is no longer formed by several parts but forms a continuous cylindrical surface which may be easily manufactured to have a very great accuracy and will not be liable to any changes in shapes by the pressure exerted thereon. Such high accuracy in shape and solidity against pressure will also permit the body of the links to take up the axial pressure which is exerted upon each pressure ring by wedging between the conical or V-shaped pulleys. This, in turn, means that the wall thickness of the pressure ring no longer has to be so thick as to render the ring self-supporting. On the contrary, it may be made so thin as to make the ring very elastic, and, in fact, the ratio between the wall thickness and the diameter of the ring should not even exceed a certain limit so that the elastic deformation of the pressure ring caused by the bearing clearance between the ring and the link body will not result in undue tensions. Due to such reduced wall thickness of the pressure rings, the chain will have a considerably lower weight and be capable of curving around a much smaller radius, than the chains which were previously known, which, in turn, will permit the V-type pulleys to be spaced more closely to each other and the entire transmission mechanism to be built more compactly. The continuously cylindrical bearing surface of the link body affords the further advantage that an oil film can easily form and remain between each link body and pressure ring.

A further object of the invention is to provide a simple connection between the individual links of the chain by providing each link body with a plurality of suitable straps or ears on both sides thereof which are easily formed by a simple milling operation and are adapted to engage with those of the adjacent link body and to be connected therewith by means of a link pin which is inserted in a cylindrical bore which extends transversally through all of the ears or straps and may be formed therein by a single drilling operation so as to form an individual eye in each ear or strap.

Another object of the invention is to provide a new, very simple, and efficient manner of securing the pressure rings on the link bodies in a fixed position in an axial direction and at the same time also to secure the link pins from sliding out of the chain.

In chains of this type which were known prior to this invention, the pressure rings were usually secured in axial direction by means of a snap ring or the like on each side of the pressure ring or by providing a projection on the link ears and in one piece therewith. According to the present invention, however, each pressure ring is secured in axial direction on the link body by at least one expansion ring which is mounted in corresponding grooves in the cylindrical outer wall of the link body and the inner wall of the pressure ring. Such manner of mounting the rings has a number of advantages. The individual link bodies will thus have a simple straight shape and can be manufactured very easily, economically, and accurately. By omitting the luglike projections or the lateral snap rings, respectively, which in previous chain designs limited the angular deflection of the individual chain links relative to each other, the chain has a greater ability to curve, which means that the smallest possible diameter of the chain at the same inner diameter of the pressure rings as in previous chain designs may be made considerably smaller. Furthermore, the individual link bodies will be shorter, in consequence of which a larger number of pressure rings than was previously possible may be provided in a chain of the same length.

The individual parts of the new chain may also be much more easily assembled than those of the previous chains. For securing each pressure ring in axial direction on the respective link body, only one expansion ring is generally required. If, however, the pressure rings should be easily removable, one expansion ring may be provided in both end surfaces of each ring and in a manner and position so as to permit an easy access thereto from the outside of the chain. The use of expanding rings for securing the pressure rings in the longitudinal direction of the chain also offers the two additional advantages that they may at the same time serve to secure the link pins in a very simple manner and without any additional means from sliding out of the link eyes, and that such manner of mounting will further reduce the length of the individual chain links. These last-mentioned objects of the invention are attained by providing the eyes in the link ears or straps so closely adjacent each other that when a link pin is mounted therein, a certain portion thereof will lie within the lateral confines of the pressure ring and the expansion rings for securing the same. This also constitutes an advantage over the chain types previously known.

Another object of the invention is to provide a simple and convenient manner in which the new chain may be securely mounted on the V-type pulleys or be removed therefrom. For this purpose, at least one of the pressure rings may be provided in one of its end surfaces with a groove which is preferably made of a depth corresponding to that portion of the link pin previously mentioned which lies within the lateral confines of a pressure ring so that if this pressure ring is turned to such a position that this groove exactly coincides with such portion, the link pin may then be easily removed.

Another object of the invention is to provide a new type of link pin which is formed by a pair of rocking pins which are adapted to rock or pivot upon each other and each of which is provided with a ridge like projection which is adapted to engage in a corresponding groove in the link eyes, and by means of which the link pin is pivotally connected to one of the two adjacent link bodies.

This type of rocking pin offers considerable advantages over those designed prior to this invention, in which the ridgelike projection formed a part of the connecting ears or straps of the links projecting inwardly into the eyes, and wherein the corresponding groove was provided along the link pin. Whereas in the prior structures the ridgelike projection, as well as the eye itself had to be worked out of the solid material of the link straps with great difficulty, the new type of rocking pin merely requires a simple cylindrical hole to be drilled in the link straps, and the shallow groove in such hole for receiving the ridgelike projection on one of the two rocking pins to be subsequently cut by means of a suitable broaching tool which may have a relatively thick shaft or core. Extensive experiments and tests have proven that the solidity of the link straps will not be impaired by providing the grooves therein rather than in the link pin.

Further objects, features, and advantages of the present invention will appear from the following detailed description thereof, as well as from the accompanying drawings, in which—

Fig. 1 shows a cross section through two chain links according to the invention which are connected by a link pin;

Fig. 2 shows a cross section taken along line II—II of Fig. 1;

Fig. 3 shows a front view of one chain link;

Fig. 4 shows a fraction of the sectional view as shown in Fig. 2, but on an enlarged scale;

Fig. 5 shows a cross section similar to Fig. 2 but illustrating a modification of a chain link according to the invention;

Fig. 6 shows a side view of a pressure ring;

Fig. 7 shows a front view of a pressure ring;

Fig. 8 shows a cross section taken along line VIII—VIII of Fig. 7;

Fig. 9 shows a partial cross section similar to Fig. 2 but illustrating another modification of a chain link according to the invention; while Fig. 10 shows a cross section through still another modification of a chain link according to the invention.

Referring to the drawings, the link chain according to the invention consists of a series of individual links 1, each of which is made of a single piece of material and consists of a cylindrical central body portion 2 which extends on both sides into a plurality of ears 3 which are equidistantly spaced from each other by narrow slots. Ears 3 are bored through in one direction so as to form eyes 4 in which link pins 5 are mounted so as to connect the adjacent links 1 with each other. In the particular chain links as illustrated in Figs. 1 and 2, link 6 at the right side is provided on each side with four ears 3 while the left link 7 has on each side only three ears 3 which fit into the slots between the four ears 3 of link 6. The cylindrical surface 8 of the central body portion 2 carries a pressure ring 9 which is locked against any movement in the longitudinal direction of the chain by means of an expanding spring ring 10 which engages in coinciding annular grooves 11 and 12 provided in the inner peripheral surface of pressure ring 9 and in the cylindrical outer surface 8 of the central body portion 2, respectively. Grooves 11 and 12 are made of a width so as to permit expansion ring 10, which preferably has a rectangular cross-sectional shape, to have a slight lateral play between the side walls thereof. As shown particularly in Fig. 4, groove 12 is cut to such depth into the outer surface 8 of the body portion 2 that expansion ring 10 may be compressed entirely into groove 12 to permit pressure ring 9 to be slipped over such outer surface 8, whereupon expansion ring 10 snaps into groove 11 and presses resiliently against the bottom thereof, thus preventing pressure ring 9 from sliding laterally relative to link body 2. If pressure ring 9 is subjected to forces acting in the longitudinal direction of the chain, these forces will be transmitted by ring 9 to link body 2 through the side walls of grooves 11 and 12 and the corresponding lateral surfaces of expansion ring 10. In the operation of the chain, running under tension between V-type or so-called conical pulleys and when wedging into and out of such pulleys, pressure ring 9 will have a tendency to rotate slightly relative to link body 2. If expansion ring 10 then rests under a slight resilient pressure against the bottom of groove 11 in pressure ring 9, as shown in the drawings, it will have the tendency to turn with ring 9 relative to link body 2. In the event that an inwardly contracting spring ring should be used, groove 11 in pressure ring 9 must be made of sufficient depth to take up the entire spring ring while the pressure ring is being slipped over the outer cylindrical surface of link body 2; this is advisable, however, only in such cases where pressure ring 9 will be of such wall strength that the greater depth of groove 11 will not materially affect the solidity of the ring.

As may be clearly seen by a comparison of Figs. 1 and 2, pressure ring 9 is of slightly greater width than the central portion of link body 2, and the latter flanges slightly outwardly at 7' to the width of pressure ring 9. This flange 7' is cut away at two opposite points to permit the insertion of a link pin 5 into the eyes 4. After a pressure ring 9 has then been slipped over link body 2 and locked thereon by spring ring 10, the projecting edges of the adjacent pressure rings 9 will secure link pin 5 from sliding laterally out of the chain, as seen in the axial direction thereof.

In the modification of the invention as shown in Fig. 5, pressure ring 9 is secured in place on link body 2 by means of two spring rings 13 and 14. For this purpose, pressure ring 9 is provided with an inner annular recess 15 and 16 in both end walls thereof, while corresponding but deeper grooves 17 and 18, respectively, are cut into the central link body 2. After a link pin 5 has been inserted into eyes 4 at one side of link body 2, an expansion ring, for example, ring 14, is inserted into groove 18 in which it is then compressed by means of a suitable tool so as to permit pressure ring 9 to be slid laterally thereover to mount the same on link body 2 or to remove it therefrom. Expansion ring 10 will then also serve as a means to prevent the link pin from slipping laterally out of eyes 4. The advantages previously mentioned of mounting the spring rings 13 and 14 so as to press against the bottom of the recesses 15 and 16, respectively, are thus equally obtained as in the first embodiment shown in Figs. 1 to 4.

In the embodiment of the invention as shown in Figs. 6 to 8, the pressure ring 9 is provided in one of its end surfaces with a radial groove 19 of a cross-sectional shape so as to comply with that portion of a link pin 5 which falls within the width of pressure ring 9, as shown, for example, in Fig. 5. This groove 19 permits the link pin 5 to be inserted into and removed from the link body 2 without prior removal of pressure ring 9. Since the pressure rings always turn slightly during the operation of the chain when wedging into or out of the V-type pulleys, the link pin of such link, the pressure ring 9 of which is provided with a groove 19, will hardly ever be directly in line with such groove and will thus be prevented from sliding out of eyes 4.

In the event that the pressure rings 9 are made narrower than the inner distance between the two link pins 5 on each link body 2, the pins may be secured in place by providing snap rings 20 on the link body 2 at both sides of each pressure ring 9, as shown, for example, in Fig. 9. In such case, snap rings 20 only need to engage pressure ring 9 at one side and be thick enough to reach beyond the outer edges of the end surfaces of link pins 5.

Fig. 10 finally illustrates a chain construction in which the individual link pins do not form a straight cylindrical hinge pin as shown in Figs. 1 and 3, but in which each link pin consists of a pair of rocking pins 23 and 24 which are adapted to rock or roll along each other and each of which is provided on one side with a pointed ridgelike projection 25 and a curved surface 28 on the other side. Eyes 4 in the projecting ears 3 of the link bodies 21 and 22 are provided at the side opposite to the respective link body with an angular notch 26 which closely surrounds the angular ridge 25 of one of the two rocking pins, while at the side facing the respective link body, eyes 4 are provided with a wider recess 27 which permits ridge 25 of the other rocking pins to move laterally therein. The curved inner surfaces 28 of rocking pins 23 and 24 are adapted to roll or rock along each other when the adjacent links pivot relative to each other. Such manner of mounting rocking pins 23 and 24 is much more easily accomplished than the manner previously known in which the projecting ridge formed a part of the link straps or ears and wherein the eyes, as well as the inwardly projecting ridge had to be worked out of the solid material with great difficulty, while a corresponding notch was provided in the link pin. In the new mounting design, it is merely necessary to drill a single bore so as to form the round eyes 4 and then to work out the grooves 26 and 27 in eyes 4 by means of any suitable tool. In the embodiment of the invention as shown in Fig. 10, rocking pin 23 is mounted in eyes 4 so as to be relatively stationary with respect to link 22 but movable within the eyes of link 21, due to the fact that ridge 25 engages in the wider grooves 27 of link 21. On the other hand, rocking pin 24 will be substantially locked against rotation relative to link 21 due to the fact that ridge 25 engages closely in grooves 26, while it can turn relative to link 22.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a transmission chain adapted for use with V-type pulleys, the combination comprising a series of links connected in articulated relation, each of said links comprising a central body portion having a continuous cylindrical outer bearing surface and consisting of a single piece of material, a pressure ring rotatably mounted on said bearing surface and having a width substantially equal to the width of said bearing surface, and means for securing said pressure ring on said bearing surface in axial direction thereof.

2. In a transmission chain adapted for use with V-type pulleys, the combination comprising a series of links connected in articulated relation, each of said links comprising a central body portion having a continuous cylindrical outer bearing surface and consisting of a single piece of material, a pressure ring rotatably mounted on and supported by said bearing surface and having a width substantially equal to the width of said bearing surface and a wall of a thickness so as to render said pressure ring slightly resilient when subjected to outside pressure, and means for securing said pressure ring on said bearing surface in axial direction thereof.

3. In a transmission chain adapted for use with V-type pulleys, the combination comprising a series of links, each of said links comprising a central body portion having a continuous cylindrical outer bearing surface and consisting of a single piece of material, a plurality of parallel link straps each having an eye on both sides of and integral with said body portion and interdigitating with the link straps on the body portion of the adjacent link, link pins in said eyes for connecting said adjacent links for articulated movement relative to each other, a pressure ring rotatably mounted on said bearing surface and having a width substantially equal to the width of said bearing surface, and means for securing said pressure ring on said bearing surface in axial direction thereof.

4. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having a width substantially equal to the width of said bearing surface, and means for securing said pressure ring on said bearing surface in axial direction thereof.

5. In a transmission chain adapted for use with V-type pulleys, the combination comprising a series of links connected in articulated relation, each of said links comprising a central body portion having a continuous cylindrical outer bearing surface and consisting of a single piece of material, a pressure ring rotatably mounted on said bearing surface and having an inner contacting surface the width of which being substantially equal to the width of said bearing surface, said bearing surface and the inner wall of said pressure ring each having at least one groove therein in a corresponding position, and a spring ring in said corresponding grooves for securing said pressure ring in axial direction on said body portion.

6. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having an inner contacting surface, the width of which being substantially equal to the width of said bearing surface, said bearing surface and the inner wall of said pressure ring each having at least one groove therein in a corresponding position, and an expansion ring in said corresponding grooves and pressing against the bottom of the groove in said pressure ring for securing said pressure ring in axial direction on said body portion, said groove in said bearing surface having a depth at least equal to the wall thickness of said expansion ring.

7. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having an inner contacting surface, the width of which being substantially equal to the width of said bearing surface, said bearing surface and the inner wall of said pressure ring each having at least one groove therein in a corresponding position, and a spring ring in said corresponding grooves for securing said pressure ring in axial direction on said body portion, said eyes for receiving said link pin being disposed closely adjacent said body portion, the plane of the end surface of said pressure ring intersecting said eyes.

8. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having an inner contacting surface, the width of which being substantially equal to the width of said bearing surface, said bearing surface and the inner wall of said pressure ring each having a pair of grooves therein in a corresponding position, said grooves in said pressure ring facing the opposite end surfaces thereof and each being accessible from one side, and a spring ring in said corresponding grooves for securing said pressure ring in axial direction on said body portion, said eyes for receiving said link pin being disposed closely adjacent said body portion, the plane of said end surfaces intersecting said eyes.

9. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having a width substantially equal to the width of said bearing surface, said link straps each having a groove therein adjacent each end surface of said central body portion, and a spring ring in each of said grooves and having a portion projecting therefrom, said pressure ring being interposed between and rotatably slidable relative to said projecting portions of said spring rings and being secured thereby on said bearing surface in axial direction thereof, said eyes for receiving said link pins being disposed closely adjacent said body portion, the planes of the opposite outer end surfaces of said spring rings intersecting said eyes.

10. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side so as to form an eye in each strap, a link pin in said eyes on each side of said body portion for connecting said adjacent links for articulated movement relative to each other, a pressure ring rotatably mounted on said bearing surface and having an inner contacting surface, the width of which being substantially equal to the width of said bearing surface, said bearing surface and the inner wall of said pressure ring each having at least one groove therein in a corresponding position, and a spring ring in said corresponding grooves for securing said pressure ring in axial direction on said body portion, said eyes for receiving said link pin being disposed closely adjacent said body portion, the plane of the end surface of said pressure ring intersecting said eyes, at least one of said pressure rings of said chain having a groove in one end wall and extending in a radial direction thereof, said last groove in one particular rotary position of said pressure ring relative to said body position permitting said link pin to be inserted into or removed from said eyes to connect or disconnect two adjacent links of said chain.

11. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side, and a pair of opposite grooves in the wall of said bore and parallel to the axis thereof, said bore and grooves together forming an eye in each of said straps, and a link pin in said eyes on each side of said body portion for connecting said adjacent links for articulated movement relative to each other, said link pin comprising a pair of rocking pins each having an outwardly projecting ridge thereon engaging in the grooves in the eyes of the straps of said adjacent links so as to be substantially non-rotatable relative to one of said links, said rocking pins each having a curved rocking surface engaging each other and adapted to rock on each other for articulated movement relative to the adjacent link, a pressure ring rotatably mounted on said bearing surface and having a width substantially equal to the width of said bearing surface, and means for securing said pressure ring on said bearing surface in axial direction thereof.

12. In a transmission chain adapted for use with V-type pulleys, the combination comprising a series of links, each of said links comprising a central body portion having a continuous cylindrical outer bearing surface and consisting of a single piece of material, a plurality of parallel link straps on both sides of and integral with said body portion and interdigitating with the link straps on the body portion of the adjacent link, the link straps on each side of said body portion having a single bore parallel to the central axis of said body portion and extending coaxially through all of said link straps on said side, and a pair of opposite grooves in the wall of said bore and parallel to the axis thereof, said bore and grooves together forming an eye in each of said straps, and a link pin in said eyes on each side of said body portion for connecting said adjacent links for articulated movement relative to each other, said link pin comprising a pair of rocking pins each having an outwardly projecting ridge thereon engaging in the grooves in the eyes of the straps of said adjacent links, said ridge on one of said rocking pins closely engaging with the walls of one of said grooves so that said rocking pin is substantially non-rotatable relative to one of said links, the opposite groove in each eye being wider than said first groove so as to permit the ridge on the other rocking pin to move substantially freely therein, said rocking pins each having a curved rocking surface engaging each other and adapted to rock on each other for articulated movement relative to the adjacent link, a pressure ring rotatably mounted on said bearing surface and having a width substantially equal to the width of said bearing surface, and means for securing said pressure ring on said bearing surface in axial direction thereof.

References Cited in the file of this patent
UNITED STATES PATENTS

| | | |
|---|---|---|
| 2,385,946 | Schorer | Oct. 2, 1945 |
| 2,651,211 | Karig | Sept. 8, 1953 |

UNITED STATES PATENT OFFICE
CERTIFICATE OF CORRECTION

Patent No. 2,803,144                                    August 20, 1957

Werner Gesche et al.

It is hereby certified that error appears in the above numbered patent requiring correction and that the said Letters Patent should read as corrected below.

In the heading to the printed specification, line 8, foreign priority date, for "February 20, 1956" read -- February 18, 1955 --.

Signed and sealed this 26th day of November 1957.

(SEAL)
Attest:

KARL H. AXLINE
Attesting Officer

ROBERT C. WATSON
Commissioner of Patents